US012573871B2

(12) United States Patent     (10) Patent No.:   US 12,573,871 B2

Miller et al.     (45) Date of Patent:    Mar. 10, 2026

(54) MANAGING THERMAL STRESS OF A BATTERY OF AN INFORMATION HANDLING SYSTEM

(71) Applicant: Dell Products L.P., Round Rock, TX (US)

(72) Inventors: Bruce A. Miller, Georgetown, TX (US); Wen-Yung Chang, Jhong Li (TW); Yan Ning, Cedar Park, TX (US); Jui-Chin Fang, Wenshan Dist (TW)

(73) Assignee: Dell Products L.P., Round Rock, TX (US)

( * ) Notice: Subject to any disclaimer, the term of this patent is extended or adjusted under 35 U.S.C. 154(b) by 709 days.

(21) Appl. No.: 17/450,316

(22) Filed: Oct. 8, 2021

(65) Prior Publication Data

US 2023/0113227 A1     Apr. 13, 2023

(51) Int. Cl.
    *H02J 7/00*       (2006.01)
    *H01M 10/44*     (2006.01)
    *H01M 10/48*     (2006.01)

(52) U.S. Cl.
    CPC ..... *H02J 7/007194* (2020.01); *H01M 10/443* (2013.01); *H01M 10/486* (2013.01); *H02J 7/005* (2020.01); *H02J 7/007182* (2020.01); *H01M 2220/30* (2013.01)

(58) Field of Classification Search
    CPC ................................................ H02J 7/007194
    See application file for complete search history.

(56) References Cited

U.S. PATENT DOCUMENTS

| | | | | |
|---|---|---|---|---|
| 11,451,068 B1 * | 9/2022 | Nachman | ............ | H02J 7/00308 |
| 2012/0025771 A1 * | 2/2012 | Bhardwaj | ......... | H02J 7/007194 |
| | | | | 320/128 |
| 2015/0303723 A1 * | 10/2015 | Raghavan | .......... | G01N 21/7703 |
| | | | | 73/19.01 |
| 2016/0190584 A1 * | 6/2016 | Wu | ...................... | H01M 4/5825 |
| | | | | 252/182.1 |
| 2017/0077717 A1 * | 3/2017 | Lundgren | ............. | H02J 7/0047 |
| 2017/0162905 A1 * | 6/2017 | Lee | ........................ | H01M 4/485 |
| 2020/0153045 A1 * | 5/2020 | Choi | ................. | H01M 10/0567 |

\* cited by examiner

*Primary Examiner* — Hyun D Park

(74) *Attorney, Agent, or Firm* — McDermott Will & Schulte LLP

(57)          ABSTRACT

Managing a battery of an information handling system, including determining a degradation factor of the battery based on one or more parameters of the battery; determining a first thermal stress time of the battery over a first time period, including: identifying a voltage of the battery over the first time period; identifying a temperature of the battery over the first time period; calculating the first thermal stress time of the battery over the first time period based on the voltage and the temperature of the battery over the first time period; comparing the first thermal stress time of the battery of the first time period to a time threshold, the time threshold based on the degradation factor of the battery; determining, based on the comparison, that the first thermal stress time of the battery is greater than the time threshold, and in response, adjusting a charge voltage of the battery.

11 Claims, 5 Drawing Sheets

MANAGING THERMAL STRESS OF A BATTERY OF AN INFORMATION HANDLING SYSTEM

BACKGROUND

Field of the Disclosure

The disclosure relates generally to an information handling system, and in particular, managing thermal stress of a battery of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The electronics industry is suffering from battery swelling issues. In devices that use batteries, environment and operating temperatures can have an impact on battery performance and reliability including swelling. For example, polymer cell is a temperature sensitive chemical system; elevated operating & storage temperature will accelerate undesired reaction and generate gas due to the chemical reaction from internal chemistry agent.

SUMMARY

Innovative aspects of the subject matter described in this specification may be embodied in a method of managing a battery of an information handling system, including: determining a degradation factor of the battery based on one or more parameters of the battery; determining a first thermal stress time of the battery over a first time period, including: identifying a voltage of the battery over the first time period; identifying a temperature of the battery over the first time period; calculating the first thermal stress time of the battery over the first time period based on the voltage and the temperature of the battery over the first time period; comparing the first thermal stress time of the battery of the first time period to a time threshold, the time threshold based on the degradation factor of the battery; and determining, based on the comparison, that the first thermal stress time of the battery is greater than the time threshold, and in response, adjusting a charge voltage of the battery.

Other embodiments of these aspects include corresponding systems, apparatus, and computer programs, configured to perform the actions of the methods, encoded on computer storage devices.

These and other embodiments may each optionally include one or more of the following features. For instance, the degradation factor is a time to swelling (TTS) of the battery. Determining, based on the comparison, that the first thermal stress of the battery is less than the time threshold, and in response: determining a second thermal stress time of the battery over a second time period after the first time period, including: identifying a voltage of the battery over the second time period; identifying a temperature of the battery over the second time period; calculating the second thermal stress of the battery over the second time period based on the voltage and the temperature of the battery over the second time period; determining an accumulated thermal stress time of the battery based on a summation of the first thermal stress time and the second thermal stress time; comparing the accumulated thermal stress of the battery to the time threshold; and determining, based on the comparison, that the thermal stress time of the battery is greater than the time threshold, and in response, adjusting the charge voltage of the battery. The parameters include a thickness of the battery and an impedance threshold of the battery. The TTS of the battery is a function of the temperature of the battery and the voltage of the battery. The TTS of the battery is a number of days to gassing by the battery as a function of the temperature of the battery and the voltage of the battery. Performing a characterization of the battery, including determining, for two or more combinations of voltage of the battery and temperature of the battery, a swelling rate for the particular combination. Performing the characterization of the battery includes generating a non-linear model of the days to gassing by the battery based on the swelling rate for each combination of the voltage of the battery and the temperature of the battery. Adjusting the charge voltage of the battery includes lowering the charge voltage of the battery.

Particular implementations of the subject matter described in this specification can be implemented so as to realize one or more of the following advantages. For example, swelling of the battery can be minimized, reduced, and/or prevented; and a life span of the battery can be improved.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
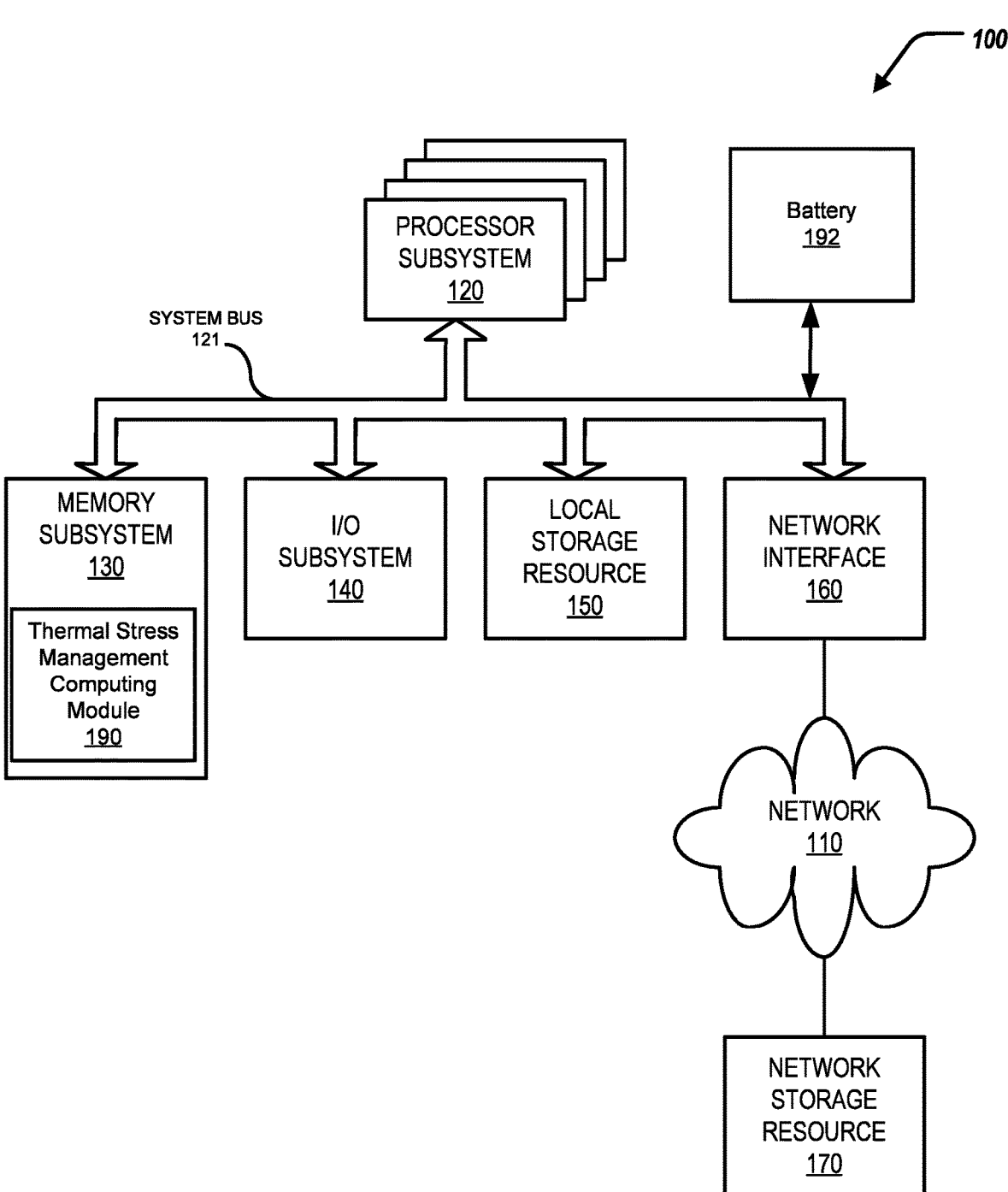
FIG. 1 is a block diagram of selected elements of an embodiment of an information handling system.

This disclosure discusses methods and systems for managing thermal stress of a battery of an information handling system. In short, a method of managing thermal stress of a battery of an information handling system, including: determining a time to swelling (TTS) model of the battery based on one or more parameters of the battery; determining a first thermal stress time of the battery over a first time period, including: identifying a voltage of the battery over the first time period; identifying a temperature of the battery over the first time period; calculating the first accumulated thermal stress time of the battery over the first time period based on the voltage and the temperature of the battery over the first time period; comparing the first accumulated thermal stress time of the battery of the first time period to a time threshold, the time threshold based on the TTS of the battery; and determining, based on the comparison, that the first thermal stress time of the battery is greater than the time threshold, and in response, adjusting a charge voltage of the battery.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can further include a battery 192.

The information handling system 100 can also include a thermal stress management computing module 190. The thermal stress management computing module 190 can be included by the memory subsystem 130. The thermal stress management computing module 190 can include a computer-executable program (software). The thermal stress management computing module 190 can be executed by the processor subsystem 120.

In short, the thermal stress management computing module 190 can reduce a charge voltage of the battery 192 based on an accumulated thermal stress that the battery 192 has experienced to minimize, reduce, or prevent swelling of the battery 192 and extend a life span of the battery 192. Specifically, a characterization of the battery 192 can be conducted in terms of temperature and voltage; establish a response surface model of a time to swelling of the battery 192; generate a thermal stress response based on the response surface model; monitor conditions at the battery 192; and adjust a charge policy at the battery 192 according to an accumulated thermal stress of the battery 192.

Figure 2:
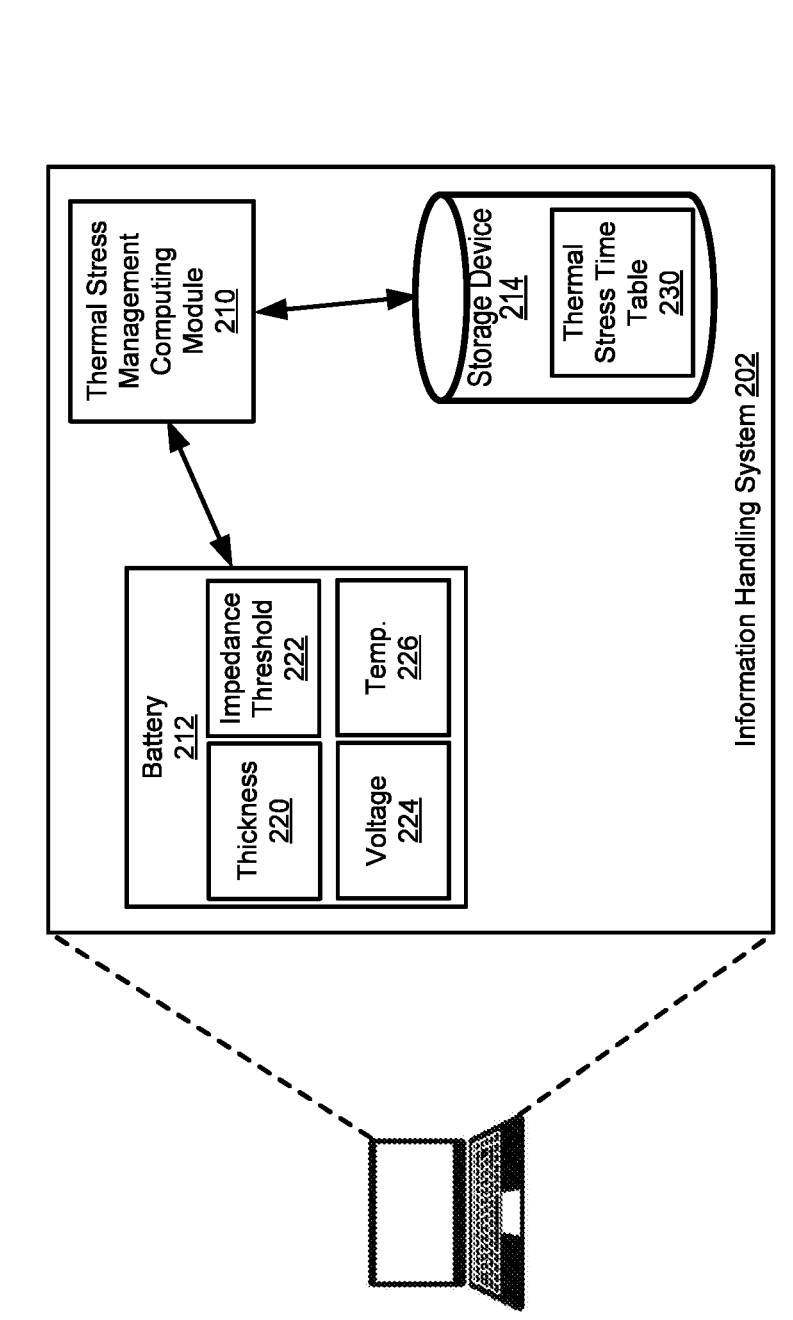
FIG. 2 illustrates a block diagram of an information handling system for managing thermal stress of a battery.

Turning to FIG. 2, FIG. 2 illustrates an environment 200 including an information handling system 202. The information handling system 202 can include a thermal stress management computing module 210, a battery 212, and a storage device 214. In some examples, the information handling system 202 is similar to, or includes, the information handling system 100 of FIG. 1. In some examples, the thermal stress management computing module 210 is the same, or substantially the same, as the thermal stress management computing module 190 of FIG. 1. In some examples, the battery 212 is the same, or substantially the same, as the battery 190 of FIG. 1.

The thermal stress management computing module 210 can be in communication with the battery 212 and the storage device 214.

Figure 3:
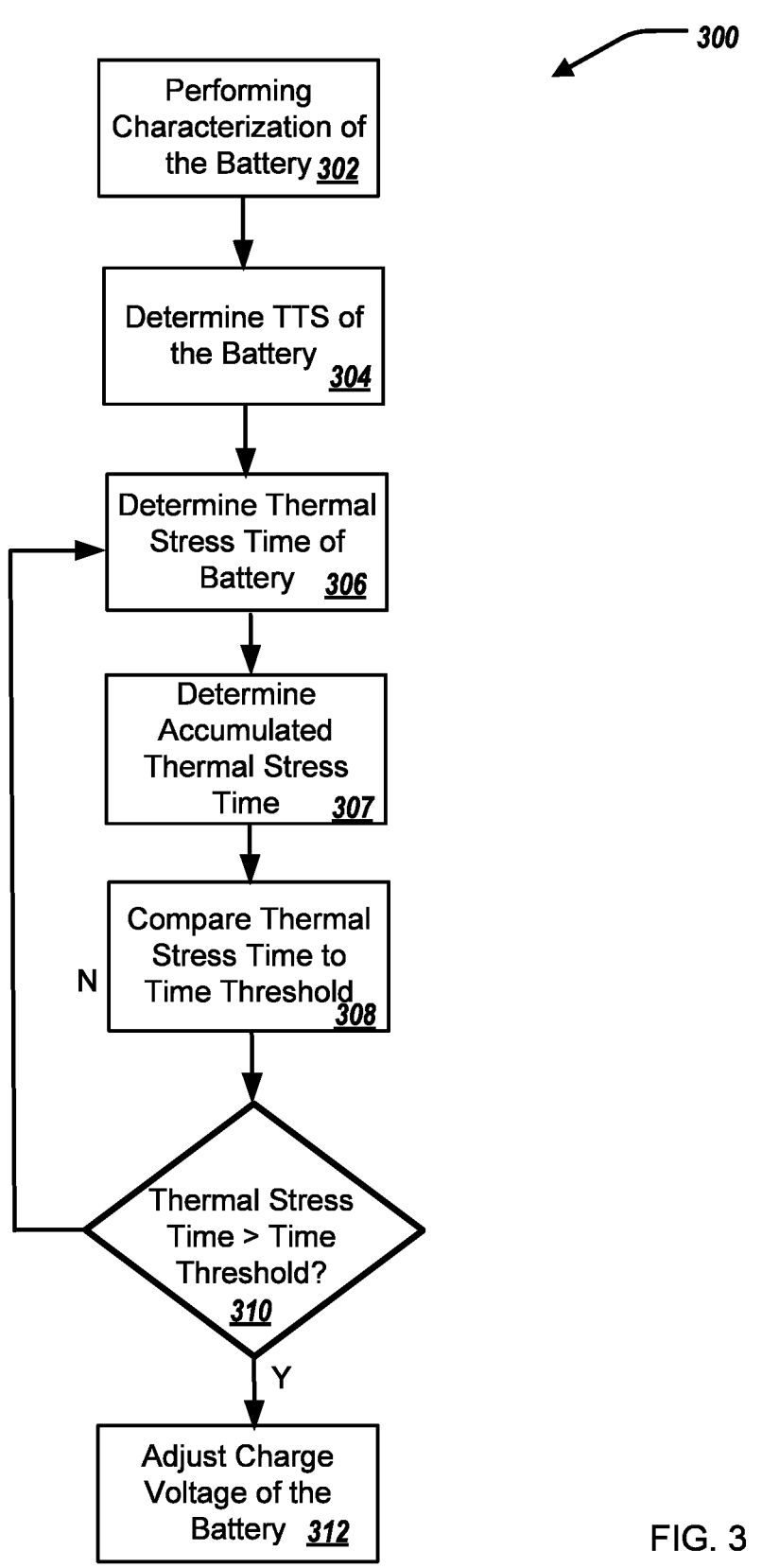
FIG. 3 illustrates a method for managing thermal stress of a battery.

FIG. 3 illustrates a flowchart depicting selected elements of an embodiment of a method 300 for managing thermal stress of a battery. The method 300 may be performed by the information handling system 100, the information handling system 202 and/or thermal stress management computing module 210, and with reference to FIGS. 1-2. It is noted that certain operations described in method 300 may be optional or may be rearranged in different embodiments.

Figure 4:
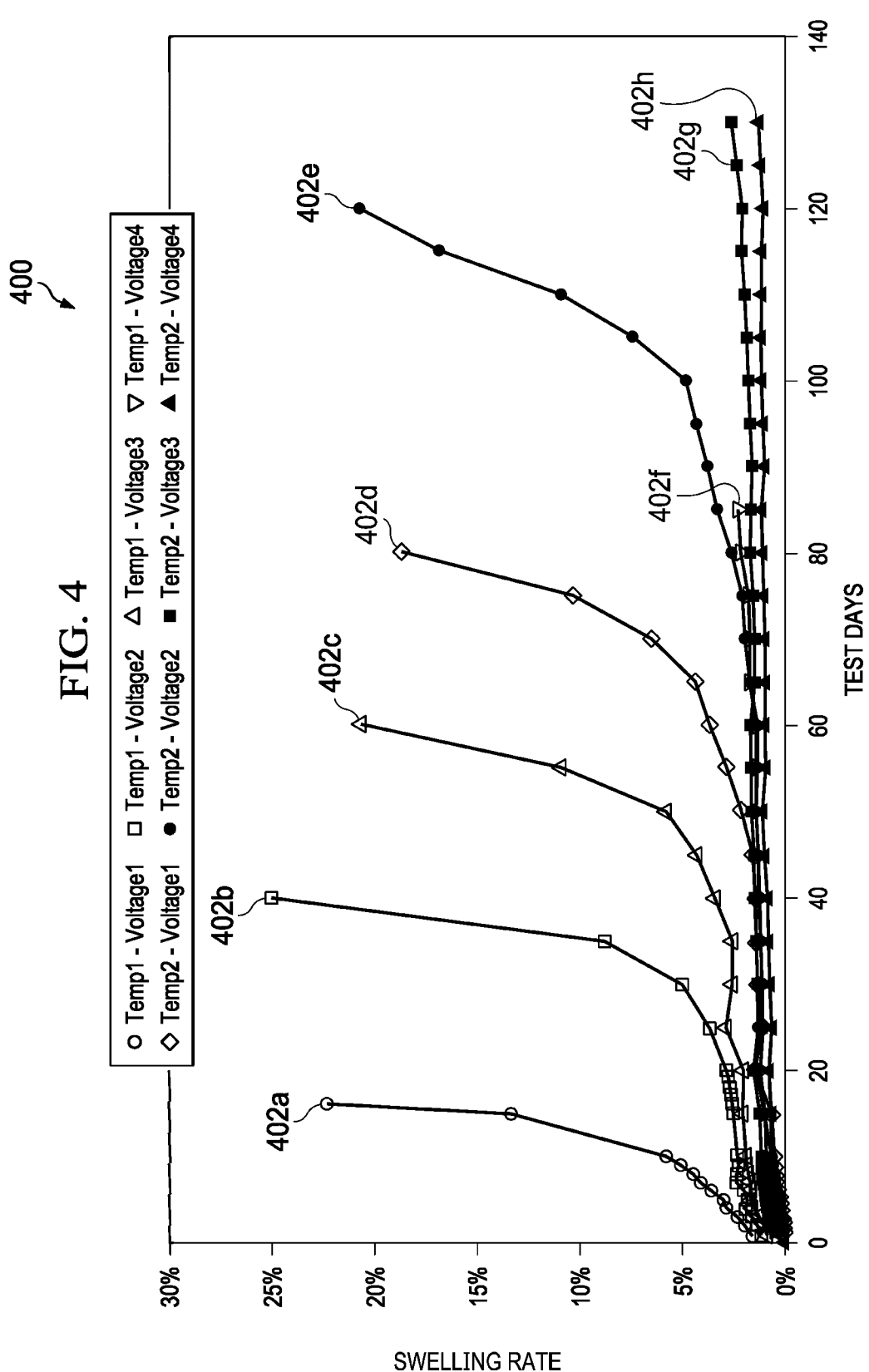
FIG. 4 illustrates a graph of characterization of the battery.

A characterization of the battery 212 is conducted, at 302. For example, the characterization can include, for multiple combinations of a voltage 224 of the battery 212 and a temperature 226 of the battery 212, a swelling rate of the battery 212. FIG. 4 illustrates a graph 400 of the swelling rate 402 (shown as swelling rates 402*a*, 402*b*, 402*c*, 402*d*, 402*e*, 402*f*, 402*g*, 402*h*) for eight different combinations of the voltage 224 of the battery and the temperature 226 of the battery 212 versus time (test days). The swelling rates 402 can differ for each voltage 224/temperature 226 of the battery 212. For example, the swelling rate 402*a* can be greater than the swelling rate 402*b*, and the swelling rate 402*b* is greater than the swelling rate 402*c*, and so forth.

Figure 5:
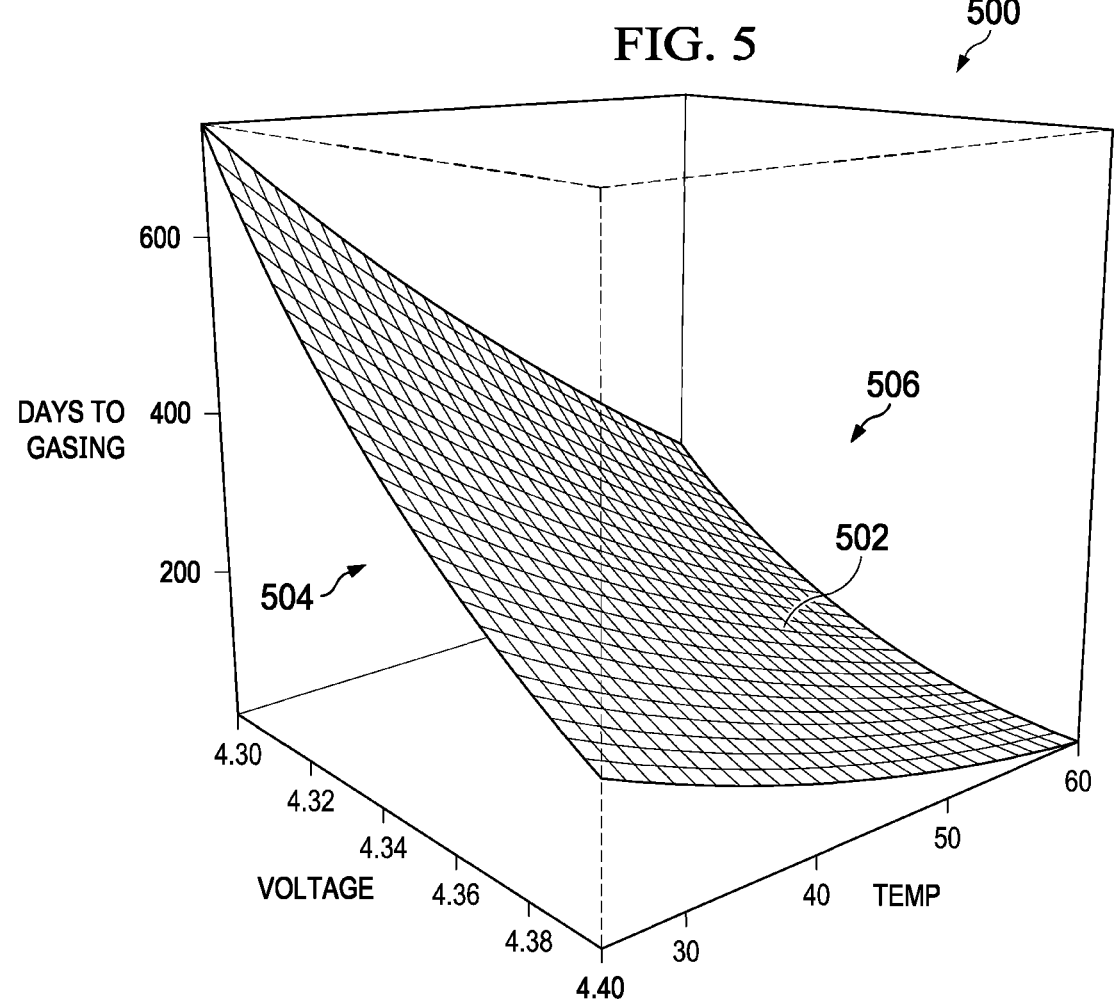
FIG. 5 illustrates a non-linear model of a time to swelling (TTS) of the battery.

In some examples, characterization of the battery 212 can further include generating a non-linear model of the days to gassing by the battery 212 based on the swelling rate for each combination of the voltage 224 of the battery 212 and the temperature 226 of the battery 212. FIG. 5 illustrates an example model 500 that indicates a gas generation response surface 502 that indicates, for each combination of the voltage 224 of the battery 212 and the temperature 226 of the battery 212, the days to gassing by the battery 212. The region 504 positioned "below" the gas generation response surface 502 can indicate a "no gas" region—i.e., a region where the combination of the voltage 224/temperature 226 of the battery 212 does not lead to gas generation by the battery 212 for the indicated amount of days. The region 506 positioned "above" the gas generation response surface 502 can indicate a "gas generation" region—i.e., a region where the combination of the voltage 224/temperature 226 of the battery 212 does lead to gas generation by the battery 212 for the indicated amount of days.

The thermal stress management computing module 210 can determine a time to swelling (TTS) of the battery 212 (degradation factor of the battery 212) based on parameters of the battery 212, at 304. The TTS of the battery 212 can indicate a physical swelling of the battery 212 such that the battery 212 is operating at suboptimal conditions, or rendered inoperable. Furthermore, when the physical swelling of the battery 212 is above a threshold, the battery 212 can impose physical damage to one or more components of the information handling system 202. The TTS of the battery 212 can be a certain physical distortion threshold of the battery 212 that renders the battery 212 and/or other components of the information handling system 202 inoperable or operating under non-nominal (non-optimal) conditions.

In some examples, the parameters of the battery 212 can include a physical thickness of the battery 212 and an impedance threshold of the battery 212. For example, for a particular voltage 224/temperature 226 of the battery 212, the battery 212 having a greater thickness can have a greater TTS due to the thickness of the battery 212 as compared to the battery 212 having a smaller thickness.

In some examples, the TTS of the battery 212 is a function of the temperature 226 and the voltage 224 of the battery 212. For example, the TTS of the battery 212 can be indicated by the model 500 in that the number of days to gassing (e.g., 200, 400, 600 days) by the battery 212 can be considered the TTS and is a function of the temperature 226 and the voltage 224 of the battery 212. In some examples, the days to gassing can indicate the number of days to swelling of the battery 212 beyond a swelling threshold such that the battery 212 and/or the information handling system 202 is inoperable, damaged, or otherwise underperforming, as indicated further above.

The thermal stress management computing module 210 can determine a first thermal stress time of the battery 212 over a first time period, at 306. The thermal stress time of the battery 212 can indicate an amount of time (seconds, minutes, days, weeks, etc.) that the battery 212 has been operating under the thermal stress conditions. Specifically, the thermal stress management computing module 210 can identify the voltage 224 (or voltages 224) of the battery 212 over the first time period. The thermal stress management computing module 210 can identify the temperature 226 (or temperatures 226) of the battery 212 over the first time period. The thermal stress management computing module 210 can then calculate the first thermal stress time of the battery 212 over the first time period based on the voltage 224 of the battery 212 and the temperature 226 of the battery 212 over the first time period. For example, for each combination of voltage 224/temperature 226 of the battery 212 over the first time period, the thermal stress management computing module 210 can determine a number of days to gassing for the battery 212 based on the model 500. In some examples, the first time period is only associated with a single voltage 224 and a single temperature 226 of the battery 212 such that the thermal stress management computing module 210 can determine a number of days to gassing for the battery 212 based on the model 500 for the particular voltage 224/temperature 226 combination of the battery 212. In some examples, the thermal stress management computing module 210 can determine the first thermal stress time of the battery based on an accumulation of the number of days to gassing for the battery 212 for each combination of the voltage 224/temperature 226 of the battery 212 within the first time period.

In some examples, the thermal stress management computing module 210 can store the value of the first thermal stress time of the battery 212 at a thermal stress time table 230 of the storage device 214. The thermal stress time table 230 can store, or provide storage of, thermal stress times of the battery 212 over multiple time periods. Table 1 illustrates an example of the thermal stress time table 230:

TABLE 1

|  | Temperature 1 | Temperature 2 | Temperature 3 |
|---|---|---|---|
| Voltage 1 | Thermal Stress Time A | Thermal Stress Time B | Thermal Stress Time C |
| Voltage 2 | Thermal Stress Time D | Thermal Stress Time E | Thermal Stress Time F |
| Voltage 3 | Thermal Stress Time G | Thermal Stress Time H | Thermal Stress Time I |
| Voltage 4 | Thermal Stress Time J | Thermal Stress Time K | Thermal Stress Time L |
| Voltage 5 | Thermal Stress Time M | Thermal Stress Time N | Thermal Stress Time O |

In some examples, the thermal stress Times A-O of Table 1 can be a coefficient between 0 and 1. Thus, based on the time period, the time period can be multiplied by the coefficient to determine the accumulated stress time. For any voltage-temperature combinations that are between values of the Table 1, linear interpolation can be used to calculate the thermal stress time.

In some examples, the thermal stress management computing module 210 can determine an accumulation of the thermal stress time of the battery 212 over two or more time periods, at 307. In the current example, the accumulated thermal stress time of the battery 212 is the first thermal stress time over the first time period.

The thermal stress management computing module 210 can compare the first thermal stress time of the battery 212 of the first time period to a time threshold, at 308. In some examples, the time threshold is based on the TTS of the battery 212. That is, the time threshold can be a percentage of the TTS (e.g., 50%, 75%, 85%, 100%). For example, based on the parameters (thickness and impedance threshold of the battery) and/or the voltage 224/temperature 226 of the battery 212, the TTS of the battery 212 can be 600 days. The time threshold can be a percentage of 600 days— e.g., 75% of 600 days is a time threshold of 450 days.

The thermal stress management computing module 210 can determine, based on the comparison, whether the first thermal stress of the battery 212 is greater than the time threshold, at 310. In some examples, when the thermal stress management computing module 210 determines that the first thermal stress of the battery 212 is greater than the time threshold, the thermal stress management computing module 210 can adjust a charge voltage of the battery 212, at 312. For example, adjusting the charge voltage of the battery 212 can include lowering, or reducing, the charge voltage of the battery 212.

In some examples, when the thermal stress management computing module 210 determines that the first thermal stress of the battery 212 is not greater than (or less than) the time threshold, the thermal stress management computing module 210, at 310, the thermal stress management 210 can determine a second thermal stress time of the battery 212 over a second time period, at 306. Specifically, the thermal stress management computing module 210 can identify the voltage 224 (or voltages 224) of the battery 212 over the second time period. The thermal stress management computing module 210 can identify the temperature 226 (or temperatures 226) of the battery 212 over the second time period. The thermal stress management computing module 210 can then calculate the second thermal stress time of the battery 212 over the second time period based on the voltage 224 of the battery 212 and the temperature 226 of the battery 212 over the second time period. In some examples, the second time period is only associated with a single voltage 224 and a single temperature 226 of the battery 212 such that the thermal stress management computing module 210 can determine a number of days to gassing for the battery 212 based on the model 500 for the particular voltage 224/temperature 226 combination of the battery 212. In some examples, the thermal stress management computing module 210 can determine the second thermal stress time of the battery based on an accumulation of the number of days to gassing for the battery 212 for each combination of the voltage 224/temperature 226 of the battery 212 within the second time period.

In some examples, the thermal stress management computing module 210 can store the value of the second thermal stress time of the battery 212 at the thermal stress time table 230 of the storage device 214.

In some examples, the thermal stress management computing module 210 can determine an accumulation of the thermal stress time of the battery 212 over two or more time periods, at 307. For example, the thermal stress management computing module 210 can determine an accumulated thermal stress time of the battery 212 based on a summation of the first thermal stress time and the second thermal stress time. The thermal stress management computing module 210 can store the value of the accumulated thermal stress time of the battery 212 at the thermal stress time table 230 of the storage device 214.

The thermal stress management computing module 210 can compare the accumulated thermal stress of the battery 212 to the time threshold, at 308. The thermal stress management computing module 210 can determine, based on the comparison, whether the accumulated thermal stress of the battery 212 is greater than the time threshold, at 310. In some examples, when the thermal stress management computing module 210 determines that the accumulated thermal stress of the battery 212 is greater than the time threshold, the thermal stress management computing module 210 can adjust a charge voltage of the battery 212, at 312. For example, adjusting the charge voltage of the battery 212 can include lowering, or reducing, the charge voltage of the battery 212.

In some examples, when the thermal stress management computing module 210 determines that the accumulated thermal stress of the battery 212 is not greater than (or less than) the time threshold, the thermal stress management computing module 210, at 310, the thermal stress management 210 can return to step 306 and proceed.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing a battery of an information handling system, including:

characterizing, based on swelling rates for multiple combinations of voltages and temperatures of the battery that are identified from testing of the battery, the battery, including generating a non-linear model including a gas generation response surface that indicates, for each combination of voltage of the battery and temperature of the battery, a time to swelling (TTS) of the battery, including:

for any voltage-temperature combination of the battery represented by the gas generation response surface that is between the multiple combinations of voltages and temperature of the battery, performing linear interpolation, based on the multiple combinations of voltages and temperature of the battery, to calculate the TTS of the battery for the voltage-temperature combinations of the battery represented by the gas generation response surface that are between the multiple combinations of voltages and temperature of the battery;

generating the non-linear model including the gas generation response surface including i) the TTS of the battery based on the multiple combinations and temperatures of the battery that are identified from testing of the battery and ii) the TTS of the battery for the voltage-temperature combinations of the battery represented by the gas generation response surface that are between the multiple combinations of voltages and temperature of the battery that are identified from testing of the battery, wherein for any particular combination of voltage of the battery, temperature of the battery, a number of days indicating a TTS in a region above the gas generation response surface, the particular combination is associated with gas generation by the battery, wherein for any particular combination of voltage of the battery, temperature of the battery, a number of days indicating a TTS in a region below the gas generation response surface, the particular combination is associated with no gas generation by the battery;

determining a first thermal stress time of the battery over a first time period, including:

identifying a voltage of the battery over the first time period;

identifying a temperature of the battery over the first time period;

calculating the first thermal stress time of the battery over the first time period based on the voltage and the temperature of the battery over the first time period; and determining that the first thermal stress time of the battery is associated with the region above the gas generation response surface for the voltage and the temperature of the battery over the first time period, and in response, adjusting a charge voltage of the battery, wherein the battery operates at the adjusted charge voltage.

2. The computer-implemented method of claim 1, further comprising:

determining, based on the comparison, that the first thermal stress of the battery is less than the time threshold, and in response:

determining a second thermal stress time of the battery over a second time period after the first time period, including:

identifying a voltage of the battery over the second time period;

identifying a temperature of the battery over the second time period;

calculating the second thermal stress of the battery over the second time period based on the voltage and the temperature of the battery over the second time period;

determining an accumulated thermal stress time of the battery based on a summation of the first thermal stress time and the second thermal stress time;

comparing the accumulated thermal stress of the battery to the time threshold; and determining, based on the comparison, that the thermal stress time of the battery is greater than the time threshold, and in response, adjusting the charge voltage of the battery.

3. The computer-implemented method of claim 1, wherein the first thermal stress time is further based on a thickness of the battery and an impedance threshold of the battery.

4. The computer-implemented method of claim 1, wherein the TTS of the battery is a number of days to gassing by the battery as a function of the temperature of the battery and the voltage of the battery.

5. The computer-implemented method of claim 1, wherein adjusting the charge voltage of the battery includes lowering the charge voltage of the battery.

6. The information handling system of claim 5, wherein the first thermal stress time is further based on a thickness of the battery and an impedance threshold of the battery.

7. The information handling system of claim 5, wherein adjusting the charge voltage of the battery includes lowering the charge voltage of the battery.

8. An information handling system comprising a processor having access to memory media storing instructions executable by the processor to perform operations, comprising:

characterizing, based on swelling rates for multiple combinations of voltages and temperatures of the battery that are identified from testing of the battery, the battery, including generating a non-linear model including a gas generation response surface that indicates, for each combination of voltage of the battery and temperature of the battery, a time to swelling (TTS) of the battery, including:

for any voltage-temperature combination of the battery represented by the gas generation response surface that is between the multiple combinations of voltages and temperature of the battery, performing linear interpolation, based on the multiple combinations of voltages and temperature of the battery, to calculate the TTS of the battery for the voltage-temperature combinations of the battery represented by the gas generation response surface that are between the multiple combinations of voltages and temperature of the battery;

generating the non-linear model including the gas generation response surface including i) the TTS of the battery based on the multiple combinations and temperatures of the battery that are identified from testing of the battery and ii) the TTS of the battery for the voltage-temperature combinations of the battery represented by the gas generation response surface that are between the multiple combinations of voltages and temperature of the battery that are identified from testing of the battery, wherein for any particular combination of voltage of the battery, temperature of the battery, a number of days indicating a TTS in a region above the gas generation response surface, the particular combination is associated with gas generation by the battery, wherein for any particular combination of voltage of the battery, temperature of the battery, a number of days indicating a TTS in a region below the gas generation response surface, the particular combination is associated with no gas generation by the battery;

determining a first thermal stress time of the battery over a first time period, including:

identifying a voltage of the battery over the first time period;

identifying a temperature of the battery over the first time period;

calculating the first thermal stress time of the battery over the first time period based on the voltage and the temperature of the battery over the first time period; and determining that the first thermal stress time of the battery is associated with the region above the gas generation response surface for the voltage and the temperature of the battery over the first time period, and in response, adjusting a charge voltage of the battery, wherein the battery operates at the adjusted charge voltage.

9. The information handling system of claim 8, the operations further comprising:

determining, based on the comparison, that the first thermal stress of the battery is less than the time threshold, and in response:

determining a second thermal stress time of the battery over a second time period after the first time period, including:

identifying a voltage of the battery over the second time period;

identifying a temperature of the battery over the second time period;

calculating the second thermal stress of the battery over the second time period based on the voltage and the temperature of the battery over the second time period;

determining an accumulated thermal stress time of the battery based on a summation of the first thermal stress time and the second thermal stress time;

comparing the accumulated thermal stress of the battery to the time threshold; and determining, based on the comparison, that the thermal stress time of the battery is greater than the time threshold, and in response, adjusting the charge voltage of the battery.

10. The information handling system of claim 8, wherein the TTS of the battery is a number of days to gassing by the battery as a function of the temperature of the battery and the voltage of the battery.

11. A non-transitory computer-readable medium storing software comprising instructions executable by one or more computers which, upon such execution, cause the one or more computers to perform operations comprising:

characterizing, based on swelling rates for multiple combinations of voltages and temperatures of the battery that are identified from testing of the battery, the battery, including generating a non-linear model including a gas generation response surface that indicates, for each combination of voltage of the battery and temperature of the battery, a time to swelling (TTS) of the battery, including:

for any voltage-temperature combination of the battery represented by the gas generation response surface that is between the multiple combinations of voltages and temperature of the battery, performing linear interpolation, based on the multiple combinations of voltages and temperature of the battery, to calculate the TTS of the battery for the voltage-temperature combinations of the battery represented by the gas generation response surface that are between the multiple combinations of voltages and temperature of the battery;

generating the non-linear model including the gas generation response surface including i) the TTS of the battery based on the multiple combinations and temperatures of the battery that are identified from testing of the battery and ii) the TTS of the battery for the voltage-temperature combinations of the battery represented by the gas generation response surface that are between the multiple combinations of voltages and temperature of the battery that are identified from testing of the battery, wherein for any particular combination of voltage of the battery, temperature of the battery, a number of days indicating a TTS in a region above the gas generation response surface, the particular combination is associated with gas generation by the battery, wherein for any particular combination of voltage of the battery, temperature of the battery, a number of days indicating a TTS in a region below the gas generation response surface, the particular combination is associated with no gas generation by the battery;

determining a first thermal stress time of the battery over a first time period, including:

identifying a voltage of the battery over the first time period;

identifying a temperature of the battery over the first time period;

calculating the first thermal stress time of the battery over the first time period based on the voltage and the temperature of the battery over the first time period; and determining that the first thermal stress time of the battery is associated with the region above the gas generation response surface for the voltage and the temperature of the battery over the first time period, and in response, adjusting a charge voltage of the battery, wherein the battery operates at the adjusted charge voltage.

* * * * *